(12) United States Patent
Eger et al.

(10) Patent No.: US 9,802,462 B2
(45) Date of Patent: Oct. 31, 2017

(54) VEHICLE HEATING SYSTEM

(71) Applicant: Eberspächer Climate Control Systems GmbH & Co. KG, Esslingen (DE)

(72) Inventors: Johannes Eger, Esslingen (DE); Robert Apfelbeck, Ludwigsburg (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 1037 days.

(21) Appl. No.: 13/934,372

(22) Filed: Jul. 3, 2013

(65) Prior Publication Data

US 2014/0008449 A1    Jan. 9, 2014

(30) Foreign Application Priority Data

Jul. 4, 2012 (DE) .......... 10 2012 211 640

(51) Int. Cl.
*B60H 1/22* (2006.01)
*F23C 9/00* (2006.01)
*F23J 15/02* (2006.01)

(52) U.S. Cl.
CPC ............ *B60H 1/2206* (2013.01); *F23C 9/00* (2013.01); *F23J 15/02* (2013.01); *B60H 2001/2268* (2013.01); *F23J 2217/105* (2013.01); *F23J 2219/30* (2013.01)

(58) Field of Classification Search
CPC ............. B60H 1/2206; B60H 2001/2268
USPC .................................... 237/12.3 C
See application file for complete search history.

(56) References Cited

U.S. PATENT DOCUMENTS

| | | | | | |
|---|---|---|---|---|---|
| 3,289,711 | A | * | 12/1966 | Hall | F02M 25/0854 141/286 |
| 3,362,637 | A | * | 1/1968 | Cornell | B60H 1/2212 236/78 A |
| 3,482,395 | A | * | 12/1969 | Rando | F01N 3/021 392/471 |
| 3,905,783 | A | * | 9/1975 | Winter | B01D 53/04 95/120 |
| 4,310,067 | A | * | 1/1982 | Thomson | F01N 3/04 181/228 |
| 4,418,662 | A | * | 12/1983 | Engler | B01D 46/0036 123/198 D |
| 4,456,457 | A | * | 6/1984 | Nozawa | B01D 39/2093 422/178 |

(Continued)

FOREIGN PATENT DOCUMENTS

DE       195 20 122 A1    12/1996
DE   10 2004 011 290 A1     9/2005
(Continued)

*Primary Examiner* — Avinash Savani
*Assistant Examiner* — Deepak Deean
(74) *Attorney, Agent, or Firm* — McGlew and Tuttle, P.C.

(57) ABSTRACT

A fuel-operated vehicle heating system includes a burner arrangement (18) with a combustion chamber (20) for burning a fuel/combustion air mixture, a fuel feed system (22) for feeding fuel (B) to the combustion chamber (20), a combustion air feed system (28) for feeding combustion air (L) to the combustion chamber (20), and a waste gas removal system (34) for removing combustion waste gases from the burner arrangement (18). A waste gas emission suppression arrangement (38, 40) is associated with the combustion air feed system (28) and/or the waste gas removal system (34).

10 Claims, 2 Drawing Sheets

(56) References Cited

U.S. PATENT DOCUMENTS

| | | | | |
|---|---|---|---|---|
| 5,121,602 A * | 6/1992 | McCorvey | F01N 3/005 | 261/84 |
| 5,277,025 A * | 1/1994 | Gonze | B60H 1/2206 | 60/274 |
| 5,563,385 A * | 10/1996 | Harwood | F01N 3/005 | 181/272 |
| 6,098,601 A * | 8/2000 | Reddy | F02D 35/00 | 123/520 |
| 6,105,708 A * | 8/2000 | Amano | B60K 15/03504 | 180/309 |
| 6,279,548 B1 * | 8/2001 | Reddy | B01D 53/02 | 123/519 |
| 6,290,558 B1 * | 9/2001 | Erickson | F01N 13/08 | 440/89 F |
| 6,412,595 B1 * | 7/2002 | Horak | F01N 13/004 | 181/221 |
| 6,421,599 B1 * | 7/2002 | Lippa | B60H 1/3208 | 60/277 |
| 7,114,492 B2 * | 10/2006 | Reddy | F01N 5/02 | 123/518 |
| 7,451,746 B2 * | 11/2008 | Bellmore | F02M 25/0836 | 123/516 |
| 7,946,277 B2 * | 5/2011 | Essig | F02M 25/089 | 123/516 |
| 8,261,531 B2 * | 9/2012 | Gandhi | F02D 41/0025 | 123/516 |
| 2003/0159309 A1 * | 8/2003 | Bsirske | C02F 1/722 | 34/275 |
| 2006/0117964 A1 * | 6/2006 | Cauchois | A23B 4/044 | 99/482 |
| 2011/0114741 A1 | 5/2011 | Kaindl | | |
| 2011/0203261 A1 * | 8/2011 | Kotrba | F01N 3/0238 | 60/285 |
| 2013/0340725 A1 * | 12/2013 | Seydell | B60K 15/035 | 123/541 |
| 2014/0190456 A1 * | 7/2014 | Van Schaftingen | B60K 15/03504 | 123/519 |

FOREIGN PATENT DOCUMENTS

| | | |
|---|---|---|
| GB | 2 354 722 A | 4/2001 |
| WO | 963 86 92 A1 | 12/1996 |

* cited by examiner

VEHICLE HEATING SYSTEM

CROSS REFERENCE TO RELATED APPLICATIONS

This application claims the benefit of priority under 35 U.S.C. §119 of German Patent Application DE 10 2012 211 640.0 filed Jul. 4, 2012, the entire contents of which are incorporated herein by reference.

FIELD OF THE INVENTION

The present invention pertains to a fuel-operated vehicle heating system, comprising: a burner arrangement with a combustion chamber for burning a fuel/combustion air mixture; a fuel feed system for feeding fuel to the combustion chamber; a combustion air feed system for feeding combustion air to the combustion chamber; and a waste gas removal system for removing combustion waste gases from the burner arrangement.

BACKGROUND OF THE INVENTION

Due to the increasingly strict requirements imposed in terms of environmental friendliness, hydrocarbon (HC) emissions are taken increasingly into account in vehicles operated with fuel, e.g., gasoline. The emission of waste gases, especially HC waste gases, is determined in so-called SHED (Sealed Housing for Evaporative Determination) tests and compared with corresponding limit values.

Since fuel-operated heating systems are increasingly used, for example, as parking heaters or auxiliary heaters in motor vehicles, the fact that such heating systems can also contribute to the waste gases generated in a vehicle shall be taken into account concerning the waste gas emissions. Such a vehicle heating system is, in principle, open towards the outside, i.e., towards the environment in both the area of the waste gas removal system and the area of the combustion air feed system. Unburned fuel still present, for example, in a combustion chamber after the end of the operation can lead to HC waste gas and its emission into the environment.

SUMMARY OF THE INVENTION

An object of the present invention is to design a fuel-operated vehicle heating system such that the emission of waste gases, especially HC waste gases, to the outside can be suppressed essentially completely.

This object is accomplished according to the present invention by a fuel-operated vehicle heating system, comprising: a burner arrangement with a combustion chamber for burning a fuel/combustion air mixture; a fuel feed system for feeding fuel to the combustion chamber; a combustion air feed system for feeding combustion air to the combustion chamber, and a waste gas removal system for removing combustion waste gases from the burner arrangement. A waste gas emission suppression arrangement is associated with the combustion air feed system and/or the waste gas removal system.

The emission of waste gases, e.g., HC waste gases, is suppressed in the vehicle heating system having the design according to the present invention by the emission of waste gases to the outside being able to be suppressed in the areas in which the system is, in principle, open towards the outside for receiving combustion air and for releasing the combustion waste gases. Fuel emissions that escape from fuel that is still present and has not been burned any longer in lines, in a porous evaporator medium or the like can thus be retained in the vehicle heating system.

Provisions may be made, for example, in the vehicle heating system according to the present invention for the waste gas emission suppression arrangement to comprise an air filter arrangement, wherein the air filter arrangement may advantageously comprise at least one activated carbon filter unit.

The provision of such an air filter arrangement, especially activated carbon filter unit, causes that the waste gases moving via the combustion air feed system or combustion air lines or ducts in the direction of the environment cannot move through the filter material but are bound therein at least temporarily. Since the direction of motion of the waste gases in an inoperative state of the vehicle heating system is, in principle, opposite the direction of flow in which the combustion air fed during the combustion operation flows, the combustion air being delivered in the direction towards the combustion chamber flows through the air filter arrangement or the filter material present therein in the direction that is opposite the waste gas emission. The combustion air now removes waste gases bound in the filter material of the air filter arrangement from the filter material and transports these in the direction of the combustion chamber, where they can be burned together with the combustion air and the fuel fed by the fuel feed system. It is thus not only the emission of waste gases that is reduced. The efficiency of combustion of the fuel available is rather increased as well, because the waste gases that would otherwise be lost can also be returned into the combustion process.

Provisions may be made in an arrangement that is of an especially simple design and is especially efficient concerning the suppression of waste gas emissions for the waste gas emission suppression arrangement associated with the combustion air feed system to be arranged in the direction of delivery of a combustion air delivery arrangement upstream relative to the latter.

To make it possible to support the effect of discharging waste gases taken up in the filter material of the filter arrangement, which effect was explained above, it is proposed that a heating arrangement be associated with the air filter arrangement. The release of waste gases bound and deposited in the filter material and hence the return thereof into the combustion process is supported by the heating of the air filter arrangement and of the filter material present therein.

The heating arrangement may comprise a waste gas heat exchanger unit in an embodiment that is specially advantageous in terms of energy efficiency. The heat being transported, for example, in the waste gases leaving the combustion chamber, which heat would otherwise be lost as waste heat, can thus be utilized to raise the temperature of the filter material of the filter arrangement during the combustion operation and thus to support the release of waste gases bound or deposited therein without the use of additional energy being necessary for this.

Provisions can be made for supporting the release of waste gases from the filter material for the heating arrangement to comprise an electrically excitable heating unit especially if a thermal interaction between the combustion waste gases and the filter material is not possible for structural reasons.

To reliably prevent the discharge of waste gases via the waste gas removal system, the waste gas emission suppression arrangement associated with the waste gas removal system may comprise a closing arrangement closing a waste gas-carrying duct. Since the waste gases, on the other hand, and the waste gases being carried during the combustion operation flow through the waste gas removal system in the same direction, it is not possible, in principle, to use filter material in the waste gas removal system, because the combustion waste gases now flowing through such a filter material during the combustion operation would absorb the waste gas absorbed in the filter material and transport them to the outside into the environment. The provision of a closing arrangement rather ensures a state of the waste gas removal system that is also closed against the emission of waste gases, especially when the vehicle heating system is not in operation. To keep the volume being gradually filled with waste gases in the inoperative state as small as possible, the closing arrangement should be positioned as close to the waste gas discharge of the burner arrangement as possible.

In an embodiment that can be embodied with an especially simple design, the closing arrangement may comprise a siphon unit (also known as a trap, a liquid trap or an inverted siphon). The combustion waste gases leaving the combustion chamber can flow through this liquid trap at the pressure difference present during the combustion operation. However, since the waste gases escaping from unburned fuel cannot build up such a high pressure in the inoperative state, the trap reliably ensures that waste gases cannot escape to the outside.

In an alternative embodiment, the closing arrangement may comprise a closing flap unit adjustable between a closing position and a release position. It is consequently possible in case of this design to actively ensure by actuation that a defined closing of the waste gas removal system is brought about. It is possible in a comparatively simple manner to achieve positioning as close as possible to the volume area at which waste gases are generated especially if the closing arrangement is designed with a closing flap unit.

The present invention will be described below in detail with reference to the enclosed figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
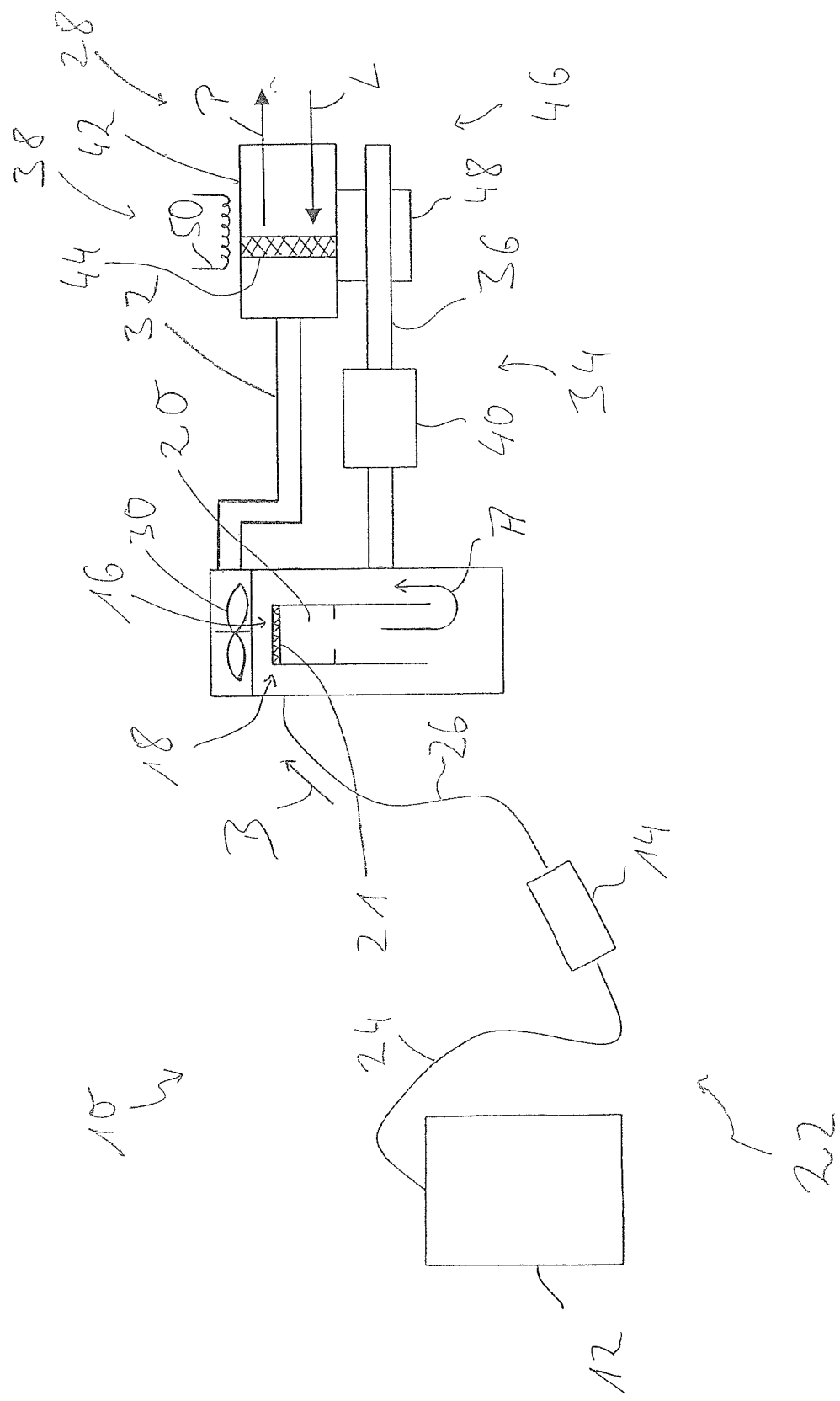
FIG. 1 is a schematic view of a fuel-operated vehicle heating system.

Referring to the drawings in particular, FIG. 1 shows a schematic view of a fuel-operated vehicle heating system generally designated by 10. The vehicle heating system 10 may be used, for example, as a parking heater and/or as an auxiliary heater in order to generate heat by the combustion of liquid fuel B being stored in a tank 12 and to transfer same to a heat carrier medium, for example, the air to be introduced into the interior space of a vehicle. The fuel B is delivered during the combustion operation by a fuel delivery arrangement 14, for example, a metering pump, in the direction of a heater generally designated by 16. This heater 16 comprises a burner arrangement 18 with a combustion chamber 20 formed therein. A porous evaporator medium 21 associated with the combustion chamber 20 is provided, for example, in case the burner is designed as an evaporative burner. This evaporator medium 21 absorbs the liquid fuel B fed by the fuel delivery arrangement 14, distributes this in its inner volume area by capillary delivery action and releases fuel in the vapor form into the combustion chamber 20.

A fuel feed system generally designated by 22 comprises especially the fuel delivery arrangement 14 and the lines or ducts 24, 26 leading to and from this and being provided for conveying the fuel B.

A combustion air feed system generally designated by 28 comprises a schematically indicated combustion air feed arrangement 30, for example, a side channel blower or the like. The combustion air feed arrangement 30 delivers in the combustion operation the combustion air L taken up from the environment via a line or a connection duct 32 in the direction of the burner arrangement 18 or into the combustion chamber 20, where a mixture of combustion air L and fuel B or fuel vapor is formed and can be caused to burn.

The combustion waste gases A generated during the combustion in the combustion chamber 20 can be released to the outside, for example, after flowing through a flame tube or a heat exchanger arrangement not shown in FIG. 1 via a waste gas removal system 34. The waste gas removal system 34 may have for this purpose a line or a duct 36, which either releases the combustion waste gases A leaving the heater 16 directly into the environment or also feeds them, for example, into a waste gas removal system of an internal combustion engine.

If the combustion operation is terminated in the vehicle heating system 10, which is brought about, in general, by ending the delivery operation of the fuel delivery arrangement 14 and of the combustion air delivery arrangement 30, unburned fuel, i.e., for example, unburned gasoline, cannot be prevented from being present in the inoperative state that is now present in the system, for example, in the porous evaporator medium 21 and/or in line 26, which is, in principle, open towards the combustion chamber 20 despite safety measures, for example, the afterburning of fuel B still present and the continued delivery of combustion air L with the flame already extinguished. Since the combustion chamber 20 is, in principle, open towards the environment via the combustion air feed system 28 and the waste gas removal system 34, it is now possible that waste gases, especially HC waste gases, will escape from this fuel and reach the environment via the combustion air feed system 28 and/or the waste gas removal system 34. Since such a waste gas emission, especially HC emission, must not exceed limited values set at different levels in different countries and HC emissions must not be emitted into the environment at all in case of so-called ZERO emission vehicles, a respective waste gas emission suppression arrangement 38 and 40 is associated with both the combustion air feed system 28 and the waste gas removal system 34 in the vehicle heating system shown in FIG. 1.

The waste gas emission suppression arrangement 38 of the combustion air feed system 28 comprises an air filter arrangement generally designated by 42, which is provided in the path of the air flow upstream in relation to the combustion air delivery arrangement 30 and the heater 10 or the burner arrangement 18. The air filter arrangement 42 may comprise, for example, at least one activated carbon filter unit 44. The combustion air L being delivered through the combustion air delivery arrangement 30 can, in principle, flow through this activated carbon filter unit 44. However, the waste gases moving opposite the direction of flow of the combustion air L in the direction indicated by an arrow P are bound in the filter material of the at least one activated carbon unit 44 and thus cannot enter the environment. During a subsequent combustion operation, combustion air L will again pass through the filter material of the at least one activated carbon filter unit 44 in a direction opposite the direction of flow P and remove in the process waste gas material being absorbed or deposited therein and transports same in the direction of the combustion chamber 20. Since such waste gases are, in general, HC waste gases in a vehicle heating system 10 operated with liquid fuel, e.g., gasoline, these waste gases, which are bound at first or temporarily in the air filter arrangement 42, can be fed by the combustion air L being delivered in the direction of the combustion chamber 20 to the combustion process. It is thus not only the discharge of waste gases into the environment that is prevented. The waste gas material can rather be fed into the combustion process essentially without losses.

To support the release of waste gas material bound or deposited in the filter material of the air filter arrangement 42 during the combustion operation, a heating arrangement generally designated by 46 may be provided. This ensures that the temperature of the air filter arrangement 42 or of the filter material of the at least one activated carbon filter unit 44 is raised during the combustion operation, as a result of which the release of the waste gases bound or deposited thereon is facilitated or supported.

The heating arrangement 46 may comprise, for example, a waste gas heat exchanger unit 48, which absorbs heat being transported in the waste gases A flowing in the waste gas removal system 34 and transfers it to the filter material in the air filter arrangement 42. As an alternative or in addition, the heating arrangement 46 may comprise an electrically excitable heating unit 50, which is excited, for example, only at the beginning of the combustion operation or of the combustion air delivery operation in order to support the release of waste gas material present in air filter arrangement 42.

The waste gas emission suppression arrangement 40 provided in FIG. 1 associated with the waste gas removal system 34 is designed, in principle, to close the waste gas removal system 34. Since waste gases accumulating in the volume area upstream of this waste gas emission suppression arrangement 40 shall, in principle, be prevented from being transported to the outside together with the combustion waste gases A in the inoperative state of the vehicle heating system 10 when the operation is resumed, the volume area located upstream of the waste gas emission suppression arrangement 40 should be kept as small as possible. This means that the waste gas emission suppression arrangement 40 should be positioned as close to the heater 16 as possible, advantageously directly where the combustion waste gases A leave the heater 16 or a heat exchanger arrangement.

Figure 2:
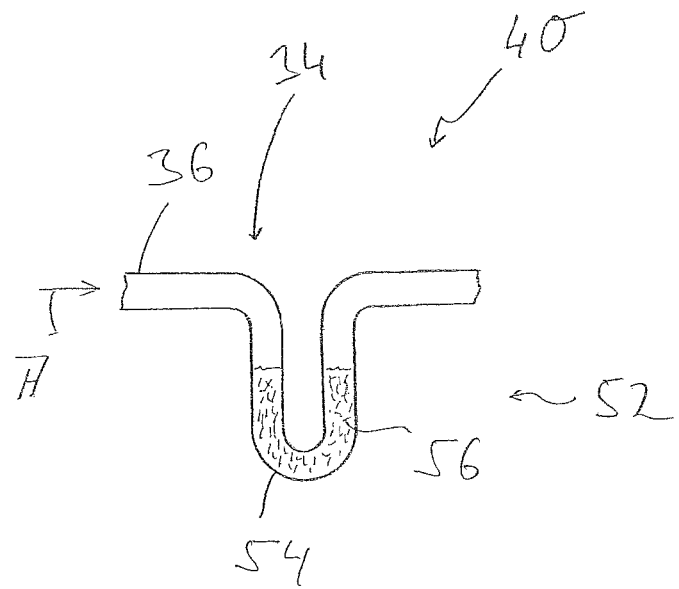
FIG. 2 is a view showing an exemplary embodiment of a closing arrangement for a waste gas removal system.
Figure 3:
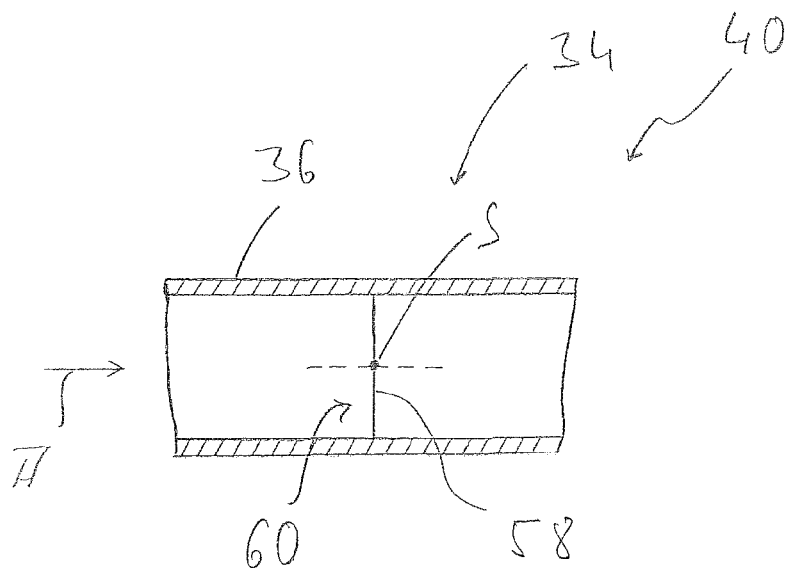
FIG. 3 is a partial sectional view showing another exemplary embodiment of a closing arrangement for a waste gas removal system.

Exemplary embodiments of waste gas emission suppression arrangements 40 bringing about closing of the waste gas removal system 34 are shown in FIGS. 2 and 3. A liquid trap generally designated by 52 is integrated, for example, in the line or the duct 36 in the design shown in FIG. 2. This trap comprises a line section 54, which is bent downward, for example, in a U-shaped pattern in the vertical direction, i.e., in the direction of gravity, in which liquid 56 absorbed due to the force of gravity collects. This liquid 56 of the liquid trap 52 brings about a permanent closing of the line or duct 36 and thus of the waste gas removal system 34. However, such an overpressure develops during the combustion operation upstream, i.e., on the left relative to the liquid trap 52 in the view shown in FIG. 2 due to the combustion waste gases A leaving the heater 26 that gas bubbles are pressed through the liquid 56 and they can flow farther in the direction of the environment downstream relative to the liquid trap 52. However, no such overpressure, which would force the passage through the liquid column in the siphon arrangement 52, is generated in the inoperative state due to the waste gases being gradually formed.

Another design embodiment is shown in FIG. 3. A closing flap 58 of a closing valve unit 60 generally designated by 60 is integrated there in the line or the duct 36 of the exhaust gas removal system 34. The closing flap 58 is adjustable between a closing position indicated by a solid line in FIG. 3 and a release position indicated by a broken line in FIG. 3, for example, by pivoting about a pivot axis generated designated by S by driving by a pivot drive, not shown, of the closing flap unit 60.

If the vehicle heating system 10 shown in FIG. 1 is put into operation, the closing flap 58 can be brought into the release position in order to make possible the passage of the combustion waste gases A. When the combustion operation is ended, the closing flap 58 can be brought into its closing position, in which it prevents the waste gases from escaping from the waste gas removal system 34.

In a design variant of the embodiment of the waste gas emission suppression arrangement 40 shown in FIG. 3, the closing flap 48 could also be carried pivotably about the pivot axis S such that it moves into the closing position under the force of gravity. When the vehicle heater 10 is put into operation, such an overpressure is again generated by the combustion waste gases A now flowing via the line or duct 36 that the flap is pivoted from its closing position into a release position and the waste gases can leave the waste gas removal system 34 or can flow farther in this. The pressure generated by the gradual emission of hydrocarbons is not sufficient in the inoperative state to move the closing flap out of its closing position, as a result of which the waste gases are reliably prevented from being discharged.

While specific embodiments of the invention have been shown and described in detail to illustrate the application of the principles of the invention, it will be understood that the invention may be embodied otherwise without departing from such principles.

What is claimed is:

1. A vehicle fuel-operated heating system comprising:
   a burner arrangement with a combustion chamber for burning a fuel/combustion air mixture;
   a fuel feed system for feeding fuel to the combustion chamber;
   a combustion air feed system for feeding combustion air to the combustion chamber, the combustion air feed system comprises a combustion air feed arrangement with a direction of delivery;
   a waste gas removal system for removing combustion waste gases from the burner arrangement, the waste gas removal system comprising a waste gas-carrying duct through which all combustion waste gases, from the burner arrangement, flow, for removal of the combustion waste gases from the burner arrangement;
   a waste gas emission suppression arrangement associated at least with the combustion air feed system and arranged upstream of the combustion air feed arrangement, with respect to the direction of delivery, said waste gas emission suppression arrangement comprising an air filter arrangement, and the waste gas emission suppression arrangement is further associated with the waste gas removal system and further comprises a closing arrangement, comprising a liquid trap, closing the waste gas-carrying duct of the waste gas removal system; and a heating arrangement associated with the air filter arrangement.

2. A vehicle heating system in accordance with claim 1, wherein the air filter arrangement comprises at least one activated carbon filter unit.

3. A vehicle heating system in accordance with claim 1, wherein the heating arrangement comprises a waste gas heat exchanger unit.

4. A vehicle heating system in accordance with claim 1, wherein the heating arrangement comprises an electrically excitable heating unit.

5. A vehicle heating system in accordance with claim 1, wherein the combustion air feed arrangement comprises a blower.

6. A fuel-operated heating system comprising:

a burner arrangement with a combustion chamber for burning a fuel/combustion air mixture;

a fuel feed system connected to the combustion chamber;

a combustion air feed system connected to the combustion chamber, the combustion air feed system defining a passage though which combustion air is fed to the combustion chamber in a combustion air feed direction and hydrocarbon gas and waste gas can be released from the combustion chamber during a period of non-operation of the heating system;

a waste gas removal system connected to the combustion chamber, the waste gas removal system comprising a waste gas-carrying duct through which all combustion waste gases, from the burner arrangement, flow, for removal of the combustion waste gases from the burner arrangement and though which hydrocarbon gas and waste gas can be released from the combustion chamber during a period of non-operation of the heating system;

a hydrocarbon gas and waste gas emission suppression arrangement associated with the combustion air feed system for suppressing a release of hydrocarbon gas and waste gas through the combustion air feed system, the hydrocarbon gas and waste gas emission suppression arrangement comprising an air filter arrangement suppressing an outflow of hydrocarbon gas and waste gas from the combustion chamber through the combustion air feed system, the air filter being arranged, with respect to the combustion air feed direction of the combustion air delivery arrangement, on an upstream side of the combustion air feed system, and the hydrocarbon gas waste gas emission suppression arrangement is further associated with the waste gas removal system and further comprises a closing arrangement comprising a liquid trap, the liquid trap closing the waste gas-carrying duct of the waste gas removal system to prevent hydrocarbon gas and waste gas from being released from the combustion chamber during a period of non-operation of the heating system; and a heating arrangement associated with the air filter arrangement, whereby hydrocarbon gas and waste gas released from the combustion chamber during a period of non-operation is suppressed from outflow from the combustion air delivery arrangement by the air filter arrangement with a portion of the hydrocarbon gas and waste gas being bound or deposited thereon and whereby the heating arrangement raises a temperature of the air filter arrangement during combustion operation, as a result of which the release of the hydrocarbon gas and waste gases bound or deposited thereon is facilitated or supported.

7. A vehicle heating system in accordance with claim 6, wherein the air filter arrangement comprises at least one activated carbon filter unit.

8. A vehicle heating system in accordance with claim 6, wherein the heating arrangement comprises a waste gas heat exchanger unit.

9. A vehicle heating system in accordance with claim 6, wherein the heating arrangement comprises an electrically excitable heating unit.

10. A vehicle heating system in accordance with claim 6, wherein the combustion air feed system further comprises a combustion air feed arrangement comprising a blower.

\* \* \* \* \*